Dec. 26, 1950 A. W. DAVIS 2,535,904
REVERSIBLE SPEED-REDUCTION GEAR FOR SHIP PROPULSION
Filed Feb. 19, 1948 2 Sheets-Sheet 2

Inventor
ALLAN W. DAVIS
By
Young, Emery & Thompson
Attorneys

Patented Dec. 26, 1950

2,535,904

UNITED STATES PATENT OFFICE 2,535,904

REVERSIBLE SPEED-REDUCTION GEAR FOR SHIP PROPULSION

Allan William Davis, Glasgow, Scotland, assignor to The Fairfield Shipbuilding and Engineering Company Limited, Glasgow, Scotland Application February 19, 1948, Serial No. 9,564
In Great Britain March 7, 1946

2 Claims. (Cl. 74—655)

This invention relates to reversible speed-reduction gear for ship propulsion of the class comprising inter-meshing gearwheels designed to connect a unidirectional high-speed driving shaft, driven say by a steam or gas turbine, with a low-speed propeller shaft.

The invention comprises a reversible speed-reduction gear for ship propulsion comprising a medium-speed lay shaft geared to a low-speed propeller shaft, an astern pinion also geared to said propeller shaft, a primary ahead pinion geared to said lay shaft, and a double hydraulic coupling operable either to couple said primary ahead pinion to a high-speed unidirectional driving shaft for ahead propulsion with double speed-reduction through said lay shaft or, alternatively, to couple said astern pinion to said high-speed driving shaft for astern propulsion with single speed-reduction.

For normal ahead propulsion the gear has a positive clutch for connection of the primary ahead pinion direct to the high-speed driving shaft.

Figure 1:
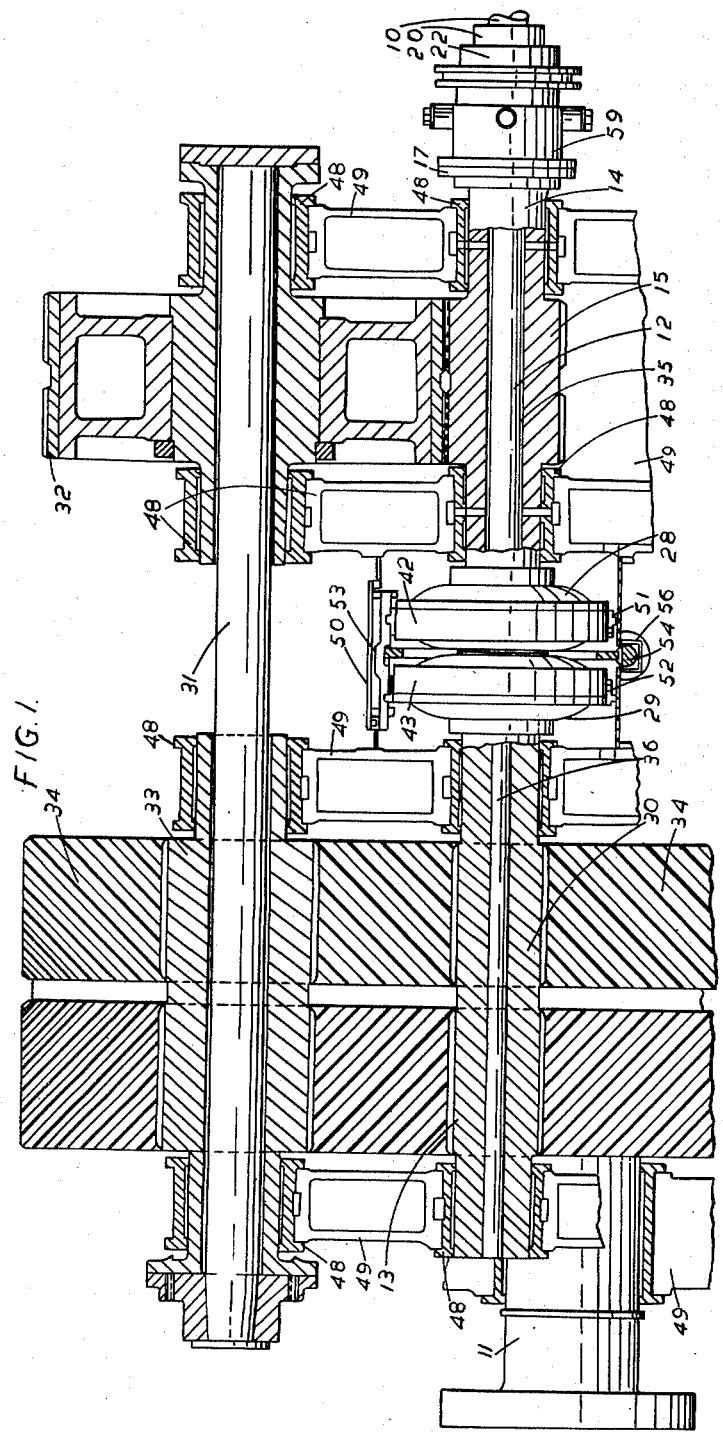
Figure 2:
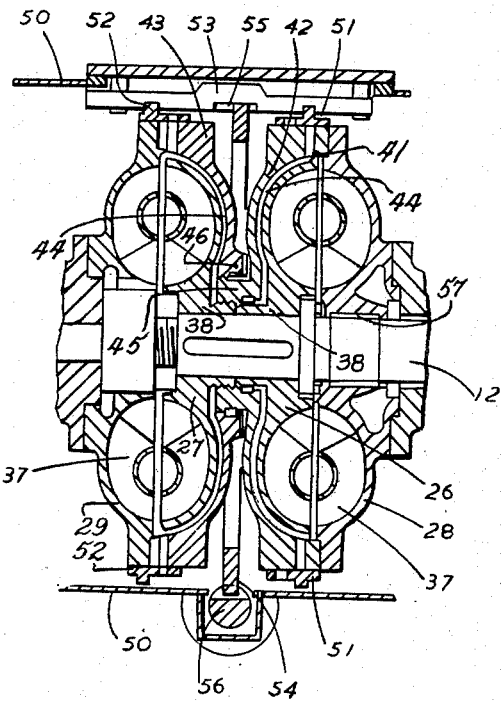
Figure 3:
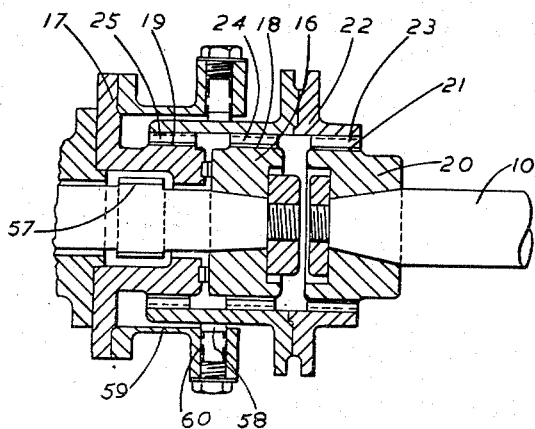

An example of a reversible speed-reduction gear embodying the invention will now be described with reference to the accompanying drawings, in which:

Fig. 1 is a sectional elevation of the gear. Fig. 2 is a mid-longitudinal section of the double hydraulic coupling. Fig. 3 is a mid-longitudinal section of a clutch incorporated in the gear. Figs. 2 and 3 are drawn to a larger scale than Fig. 1.

In the gear shown, the high-speed driving shaft is indicated by 10 and the low-speed propeller shaft by 11. In the example, there are two separate shafts 12 and 13 arranged end-to-end as a co-axial extension of the high-speed driving shaft 10. The intermediate shaft 12 is a so-called "quill-shaft," upon which is journalled a sleeve-shaft 14 formed with a small primary ahead pinion 15. At the ends of the quill-shaft, and the sleeve-shaft adjacent to the driving shaft, they are provided respectively with clutch components 16 and 17 having dog teeth 18 and 19 (see Fig. 3). The driving shaft likewise has a clutch component 20 formed with dog teeth 21. In combination with these clutch components there is provided a two-position slidable clutch component 22 having three sets 23, 24 and 25 of complemental teeth. The teeth 21 of the driving-shaft clutch component 20 are always engaged either by the teeth 23 or 24 of the slidable clutch component 22. Likewise, the teeth 18 of the quill-shaft clutch component 16 are always engaged by the teeth 24 or 25. That is to say, the driving shaft 10 is positively clutch-connected to the quill shaft 12 in both working positions of the component 22. On the other hand, the teeth 19 of the sleeve-shaft component 17 are engaged by the teeth 25 only in one position of the slidable component 22; thus, in its other position, the sleeve-shaft 14 is free from clutch-connection with the driving shaft 10. The component 22 is slidable into one or other of its two positions by any appropriate means (not shown).

At the other end of the quill-shaft 12 there is secured the driver 26, 27 of the double hydraulic coupling. An ahead coupling 28 is secured to the sleeve-shaft 14. An astern coupling 29 is secured to the outer of the two separate shafts, namely to the shaft 13, this shaft being formed with a small astern pinion 30.

The lay-shaft 31 of the gear has secured to it a medium-sized wheel, namely the ahead primary gearwheel 32, and a small wheel, namely the ahead secondary pinion 33 of the double-reduction gear train, the secondary pinion meshing as usual with a large secondary gearwheel 34 secured to the propeller shaft. The astern pinion 30 meshes with the secondary gearwheel 34.

In the example the two coupling units 26, 28 and 27, 29 constituting the double hydraulic coupling are supplied with oil by way of passages leading through the shafting. That is to say, oil to the ahead unit 26, 28 is led through an annular passage 35 between the quill-shaft and the sleeve-shaft; and oil to the astern unit 27, 29 is led through a central bore 36 in the astern-pinion shaft. Each component of the coupling is made in usual manner, being a vaned, cup-like member, the vanes being indicated by 37 in Fig. 2. The driver comprises two components 26 and 27 which are arranged back to back, being the proximal members of the coupling. The bosses 38 of these components are secured to the quill-shaft 12. The ahead and astern couplings 28 and 29, which constitute the driven components, are the distal members of the coupling. These driven components 28 and 29 mate with the driving components 26 and 27, respectively, and oil passes through each driven component either to the mating component (the coupling unit then being engaged) or through oil outlets 41 (the coupling unit then being disengaged). Each driven component forms part of a casing which includes also an inner member 42 or 43 each of which encloses the mating driving component 26 or 27. There is an oil passage 44 between each such mating component 26 or 27 and the associated casing member 42 or 43. The casing member 42 of the ahead coupling has an inner boss 45 which encircles and makes seal with the bosses 38 of the driving components. The casing member 43 of the astern coupling has an outer boss 46 which encircles and makes seal with said inner boss 45. Each oil seal is of usual construction. The arrangement is such that when either coupling is engaged, oil is supplied to both seals by way of the passages 44.

The various bearings 48 in which shafts of the gear are journalled are as usual all mounted in a stationary casing incorporating framework portions 49 of which are shown. The framework encloses an inner housing, including a case 50, in which the double hydraulic coupling and its operating mechanism are enclosed.

The previously mentioned oil outlets 41 of the ahead and astern couplings are controlled by valves 51 and 52 interconnected by axially slidable control bars 53. In the example, there are three of these bars, and they are equi-spaced around the axis of the gear, but only one of them is shown. These bars are controlled by a cam ring 54 which engages an inclined notch 55 in each bar 53 and which is angularly adjustable around the gear axis by means of an endwise adjustable rack bar 56, the teeth of which mesh with teeth on the periphery of the ring 54. The bar 56 extends to the exterior of the case 50 so that it can be moved into one or other of its two operative positions. The arrangement is such that when the ring 54 is moved by the bar 56 to either limit of its range of adjustment, it opens the valves 51 or 52 controlling the oil outlets 41 of one unit and closes the oil outlets of the other unit. The oil outlets, when open, discharge into the case 50.

In operation of the gear, for ahead running using the ahead coupling, for instance during manoeuvring of the ship, the slidable clutch component 22 is positioned so that the set of teeth 25 engage the quill-shaft clutch component 16, leaving the sleeve-shaft component 17 free. Thus, the drive is transmitted from the high-speed shaft 10 through the quill-shaft 12, thence through the ahead coupling 26, 28 to the sleeve-shaft 14, and thence through the primary gear-wheels 15, 32 and secondary gear-wheels 33, 34 to the propeller shaft 11. That is to say, the gear is set for double-reduction transmission.

For astern running, the slidable clutch component 22 occupies the same position, the drive in this instance being transmitted from the quill-shaft 12 through the astern coupling 27, 29 to the outer shaft 13 and thence through the astern pinion 30 direct to the secondary gear wheel 34. That is to say, the gear is set for single-reduction transmission.

For ahead running using the dog-toothed clutch in substitution for the hydraulic coupling, the slidable component 22 occupies a position in which the set of teeth 24 engage the clutch component 16 on the quill-shaft 12 and the other set of teeth 25 engage the clutch component 17 on the sleeve-shaft 14. Accordingly, the drive is transmitted positively through the sleeve-shaft 14 direct to the primary ahead pinion 15. That is to say, the quill-shaft 12 takes no driving torque but rotates idly in unison with the sleeve-shaft 14. By virtue of such provision the loss of efficiency associated with the transmission of torque through a hydraulic coupling is obviated for continuous running, that is to say during normal ahead running as distinct from manoeuvring. It is advantageous that the quill-shaft should be constrained to rotate in unison with the sleeve-shaft because wear on bearings 57 between the quill-shaft and the sleeve-shaft is minimised, which is advantageous seeing that such bearings may be difficult of access. It will be manifest that wear will occur only when the transmission is through the ahead or astern hydraulic coupling.

To facilitate operation of the slidable component 22 of the clutch and to avoid shock when bringing the clutch into operation in substitution for the ahead coupling, friction pads 58 are provided, such pads being carried by a holder 59 on the sleeve-shaft 14 and when operative being urged by springs 60 to bear upon the slidable clutch component. These friction pads tend to bring the speed of the sleeve-shaft 14 towards equality with that of the quill-shaft 12 at the time when the clutch is about to be engaged with the sleeve-shaft component 17.

By virtue of the invention, adequate reduction in speed is provided by the double-reduction transmission for ahead running, from the high-speed shaft 10, through the medium-speed lay-shaft 31 to the slow-speed propeller shaft 11, so that the turbine or other high-speed driver of the shaft 10 can then be operated under conditions of maximum efficiency. On the other hand, the single-reduction transmission calling for slower driving speed of the shaft 10, and therefore involving conditions of reduced efficiency, comes into operation only for astern running. Accordingly, the invention takes advantage of the fact that the maximum astern power required for ship propulsion is usually substantially less than the maximum ahead power and that, as approximately the same quantity of steam or gas is available to drive the turbine under either condition, a reduction in turbine efficiency can be accepted such as is to be associated with a drop in turbine speed appropriate to single-reduction astern gearing as compared with double-reduction ahead gearing for the same propeller speed.

Preferably, as shown, the astern pinion 30 is substantially smaller in diameter than the ahead secondary pinion 33, both of which mesh with the same secondary spurwheel. Thus the reduction in ratio of a single-reduction transmission compared with the normal double-reduction transmission is in some measure compensated by the increase due to the astern pinion of smaller diameter. This is rendered practicable because the tooth loading per unit width of gear face is reduced in the astern direction on account of the loss of efficiency in the slower running turbine and also because a higher loading per unit width of gear face width relative to the pinion diameter (or, say, one-half power of the diameter or whatever such function of the diameter might be regarded as a criterion of effective tooth loading) may be carried when running astern because of the limited duration of such functioning relative to ahead running and also because for the same reason a greater bending and torsional distortion resulting in lesser uniformity of load distribution across the face of the gear may be tolerated.

I claim:

1. A reversible speed-reduction gear for ship propulsion comprising a high-speed unidirectional driving shaft, a medium-speed lay shaft, a low-speed propeller shaft, gearing that connects said lay shaft to said propeller shaft, an astern pinion geared through said gearing to said propeller shaft, a primary ahead pinion, gearing that connects said primary ahead pinion to said lay shaft, a double hydraulic coupling operable either to couple said primary ahead pinion to said driving shaft for ahead propulsion with double speed-reduction through said lay shaft or, alternatively, to couple said astern pinion to said high-speed driving shaft for astern propulsion with single speed-reduction, and a positive clutch for connection of said primary ahead pinion direct to said driving shaft during normal ahead propulsion.

2. A reversible speed-reduction gear for marine turbine propulsion comprising a high-speed unidirectional turbine driven shaft, a low-speed propeller shaft, a medium-speed lay shaft, a small primary ahead pinion driven by the turbine-driven shaft, a primary ahead gearwheel of medium size on the lay shaft, said pinion being geared to said gearwheel, a small secondary ahead pinion on the lay shaft, a large gearwheel on the propeller shaft, said secondary ahead pinion bearing with said large gearwheel, a small astern pinion with which the turbine-driven shaft is associated, said astern pinion being geared to the large gearwheel on the propeller shaft, a hydraulic coupling operable to couple the primary ahead pinion to the turbine-driven shaft for ahead propulsion at full turbine power with two-stage speed reduction through the medium-speed lay shaft or, alternatively, to couple the astern pinion to the turbine-driven shaft for astern propulsion at reduced turbine power with single-stage speed-reduction, and a positive clutch for connection of the primary ahead pinion direct to the turbine-driven shaft during normal ahead propulsion.

ALLAN WILLIAM DAVIS.

REFERENCES CITED

The following references are of record in the file of this patent:

UNITED STATES PATENTS

| Number | Name | Date |
|---|---|---|
| 1,667,842 | Coykendall | May 1, 1928 |
| 1,682,593 | Bauer | Aug. 28, 1928 |
| 1,987,985 | Bauer | Jan. 15, 1935 |
| 2,415,760 | Porter | Feb. 11, 1947 |
| 2,423,820 | Baumann | July 15, 1947 |

FOREIGN PATENTS

| Number | Country | Date |
|---|---|---|
| 171,030 | Great Britain | Nov. 10, 1921 |
| 423,850 | Germany | Jan. 10, 1926 |
| 619,866 | Great Britain | Mar. 16, 1949 |